Figure 1:
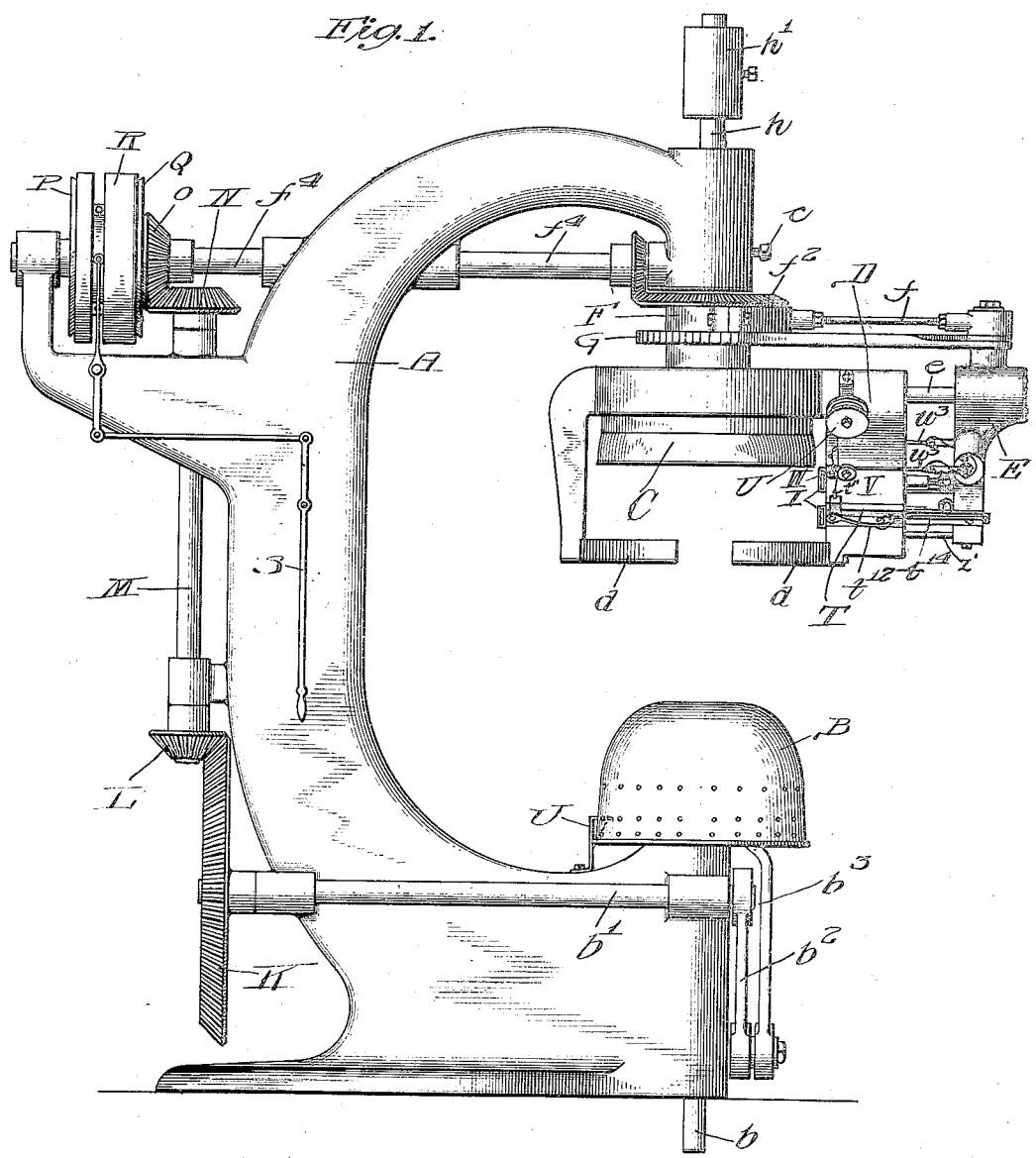

No. 828,842. PATENTED AUG. 14, 1906.
E. CRAIG.
MACHINE FOR MAKING BASKETS.
APPLICATION FILED JUNE 25, 1904.

7 SHEETS—SHEET 1.

Witnesses:
Robert H. Weir
J. B. Weir

Inventor.
Edward Craig
By Bulkley & Durand
Attys.

No. 828,842. PATENTED AUG. 14, 1906.
E. CRAIG.
MACHINE FOR MAKING BASKETS.
APPLICATION FILED JUNE 25, 1904.
7 SHEETS—SHEET 3.
Fig. 3.
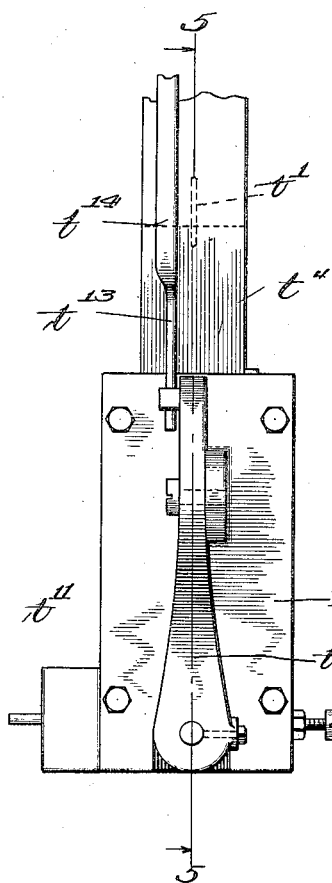
Fig. 4.
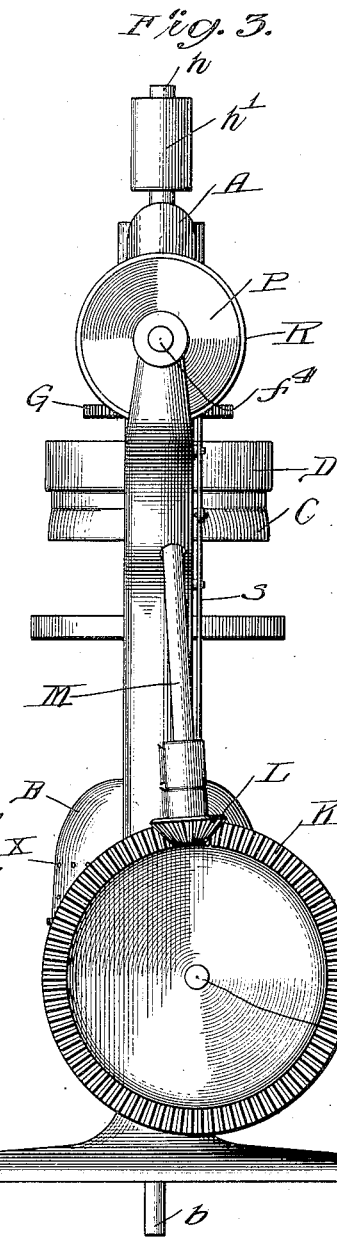
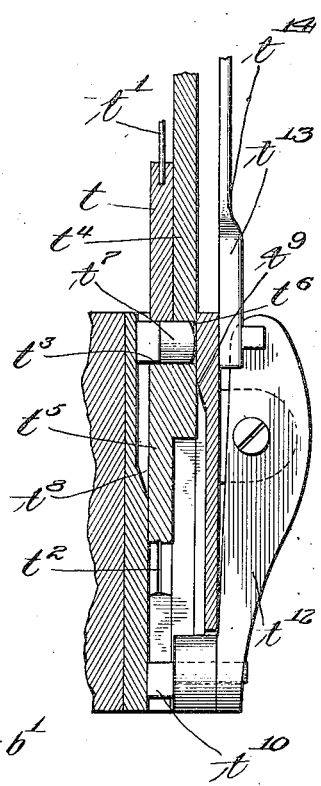
Fig. 5.
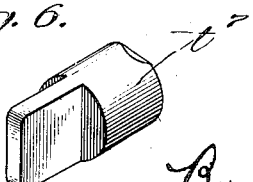
Fig. 6.
Witnesses:
Robert H. Weir
J. B. Weir
Inventor:
Edward Craig
By Buckley & Durand
Attys.

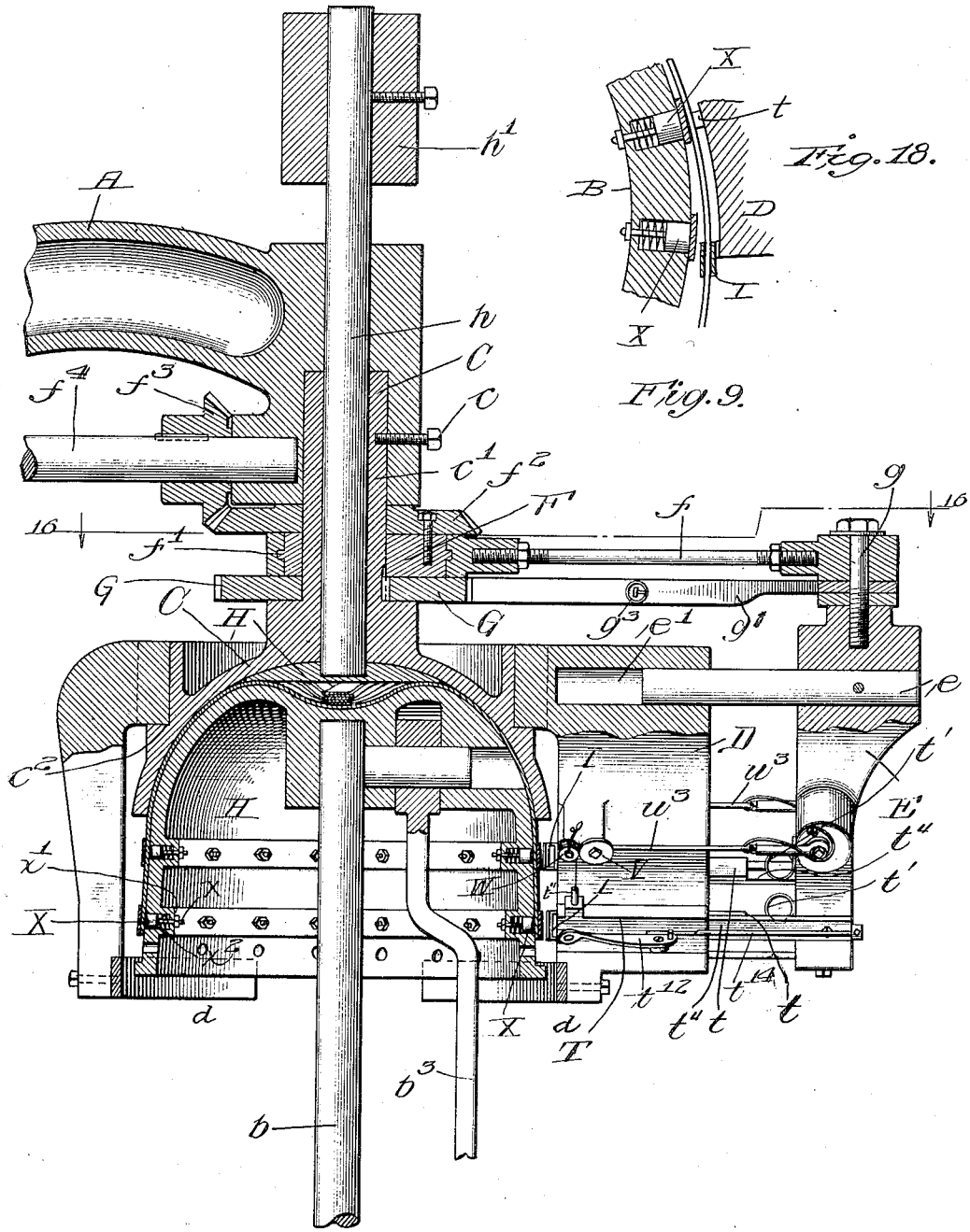

No. 828,842. PATENTED AUG. 14, 1906.
E. CRAIG.
MACHINE FOR MAKING BASKETS.
APPLICATION FILED JUNE 25, 1904.
7 SHEETS—SHEET 5.
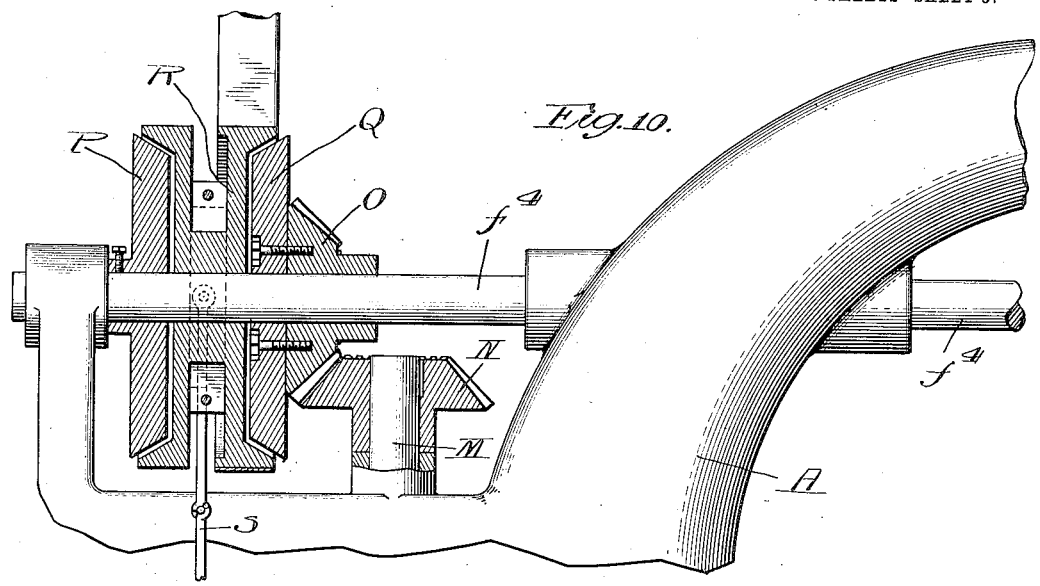
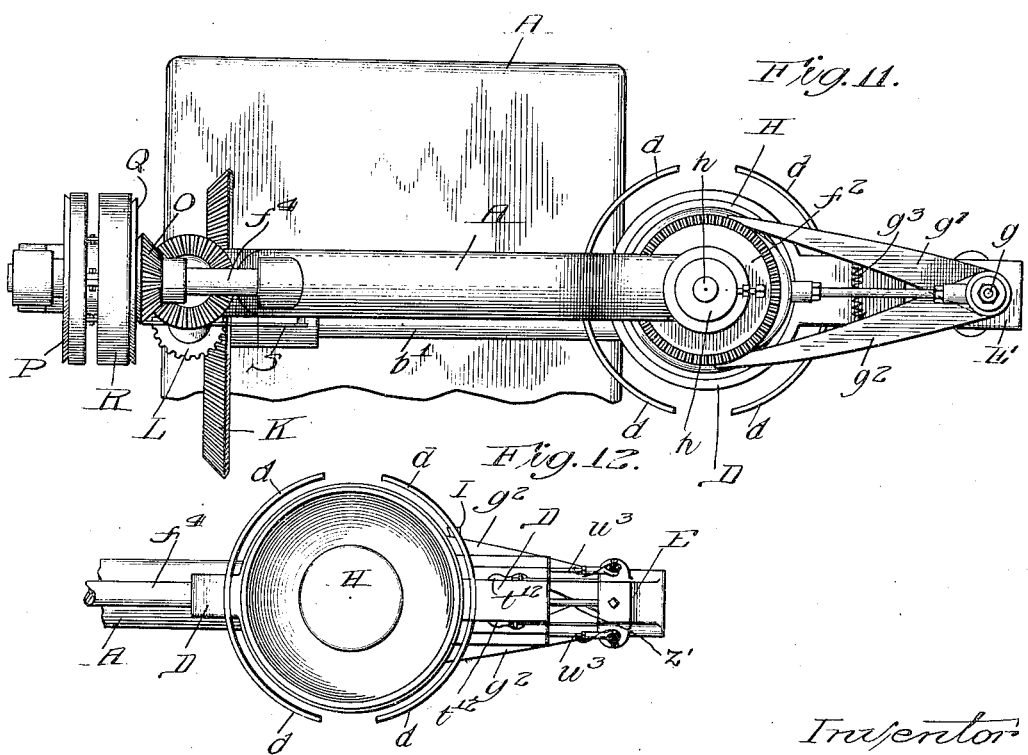
Witnesses
Robert H. Weir
H. B. Weir
Inventor
Edward Craig
By Buckley & Durand
Attys.

No. 828,842. PATENTED AUG. 14, 1906.
E. CRAIG.
MACHINE FOR MAKING BASKETS.
APPLICATION FILED JUNE 25, 1904.
7 SHEETS—SHEET 6.
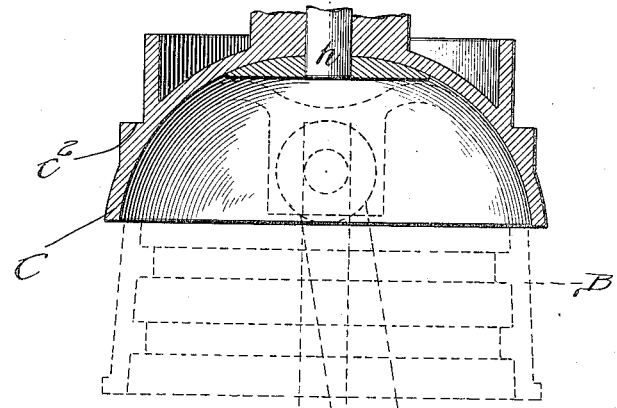
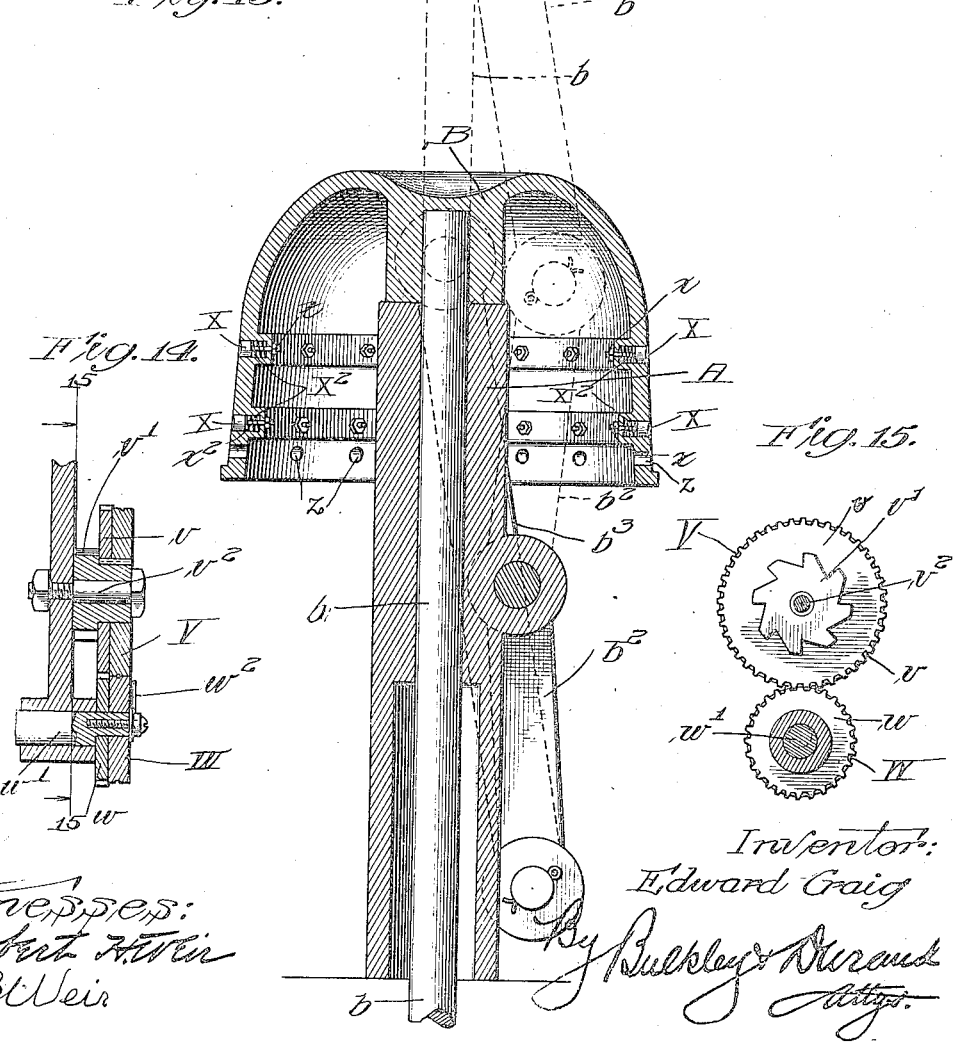
Witnesses:
Robert F. Weir
J. B. Weir
Inventor:
Edward Craig
By Buckley & Durand
Attys.

No. 828,842. PATENTED AUG. 14, 1906.
E. CRAIG.
MACHINE FOR MAKING BASKETS.
APPLICATION FILED JUNE 25, 1904.

7 SHEETS—SHEET 7.

Witnesses:
Robert H. Weir
J. B. Weir

Inventor:
Edward Craig
By Bulkley & Durand
Attys.

UNITED STATES PATENT OFFICE.

EDWARD CRAIG, OF ST. JOSEPH, MICHIGAN, ASSIGNOR, BY MESNE ASSIGNMENTS, TO WILLIAM F. BENNING, EDWARD SHEPHERD, EDWARD CRAIG, AND WILLIAM H. RAY, OF ST. JOSEPH, MICHIGAN, A COPARTNERSHIP.

MACHINE FOR MAKING BASKETS.

No. 828,842.      Specification of Letters Patent.      Patented Aug. 14, 1906.

Application filed June 25, 1904. Serial No. 214,106.

*To all whom it may concern:*

Be it known that I, EDWARD CRAIG, a citizen of the United States of America, and a resident of St. Joseph, Berrien county, Michigan, have invented a certain new and useful Improvement in Machines for Making Baskets, of which the following is a specification.

My invention relates to machines for making baskets, boxes, or other like receptacles, and particularly to machines for making the well-known form of bushel basket or half-bushel basket or any other size of basket of this particular character.

Generally stated, the object of my invention is to provide an improved, simplified, and highly efficient machine for making baskets or other receptacles of any desired form or character or for use in the manufacture of such baskets or receptacles and to provide a machine of this character which can be easily and satisfactorily operated and maintained in condition for use.

A special object is to provide an improved construction and arrangement whereby a basket may be formed and fastened together without the necessity of rotating the member or members upon which it is supported during the operation of driving the nails, staples, or other suitable fastening devices.

Another object is to provide an improved construction and arrangement which will permit the machine when installed to occupy but very little floor-space.

A further object is to provide an improved construction and arrangement whereby the mechanism for driving the fastening devices, preferably stapling mechanism, may be revolved around the basket in the operation of driving staples or other suitable fastening devices.

It is also an object to provide certain details and features of improvement tending to increase the general efficiency and serviceability of a machine of this particular character.

Figure 2:
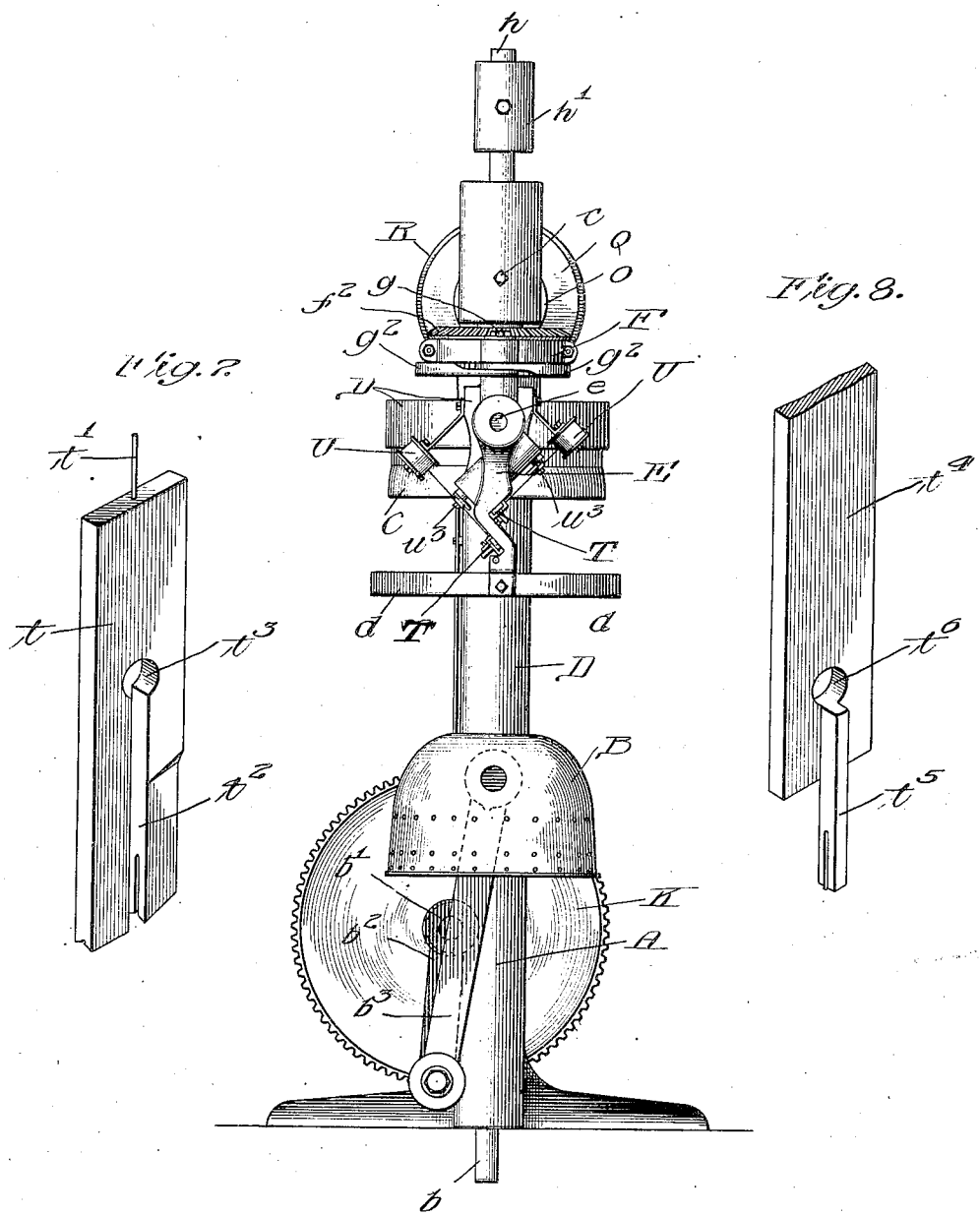
Figure 16:
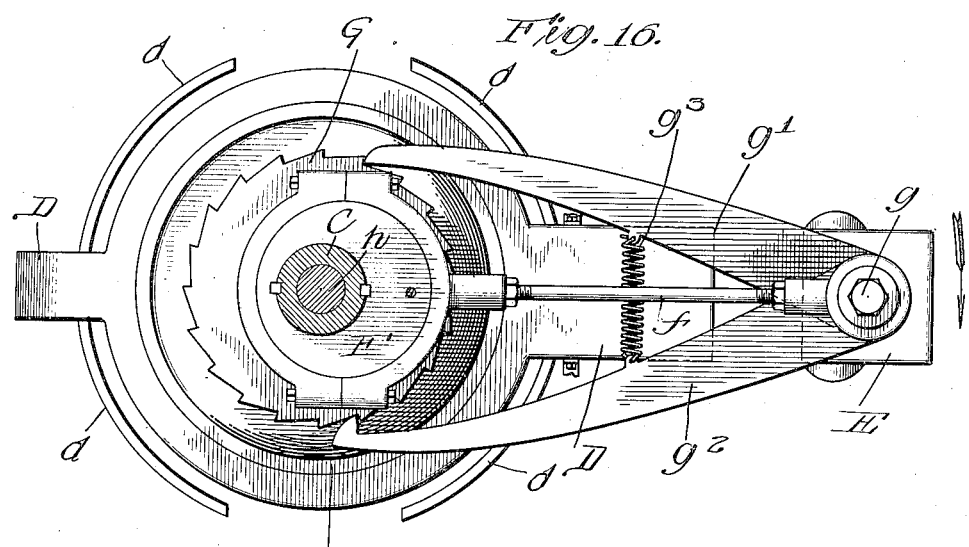
Figure 17:
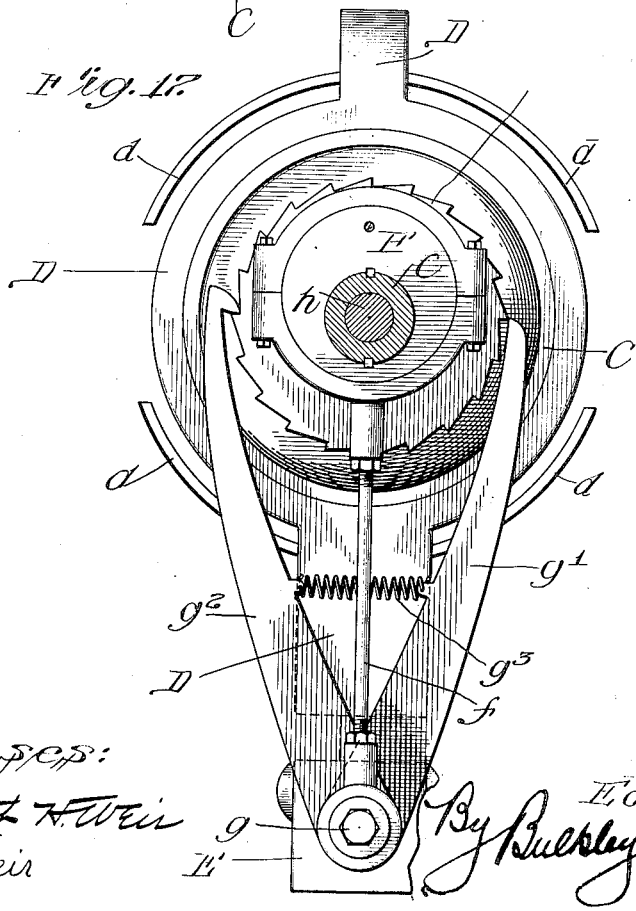

In the accompanying drawings, Figure 1 is a side elevation of a basket-making machine embodying the principles of my invention. Fig. 2 is a view of another side of the said machine. Fig. 3 is a view of still another side of the machine. Fig. 4 is an enlarged front elevation of one of the staple forming and driving devices involved in the mechanism for stapling the basket. Fig. 5 is a vertical section on line 5 5 in Fig. 4. Fig. 6 is a perspective of one of the reciprocating pins employed for alternately locking and unlocking the staple drivers and formers, so as to first permit the formers and drivers to move together and to then permit the staple-formers to remain stationary while the staple-drivers complete the work of inserting the staples in the basket. Fig. 7 is a perspective of one of the staple-formers. Fig. 8 is a similar view of one of the staple-drivers. Fig. 9 is an enlarged vertical section of the upper portion of the machine shown in Fig. 1. Fig. 10 is an enlarged section of the clutch mechanism and gearing for controlling the operation of the machine. Fig. 11 is a plan of the machine shown in Fig. 1. Fig. 12 is a bottom view of the stapling mechanism and the upper or concave forming member. Fig. 13 is an enlarged vertical section through the lower forming member or form and the upper forming member or mold. Fig. 14 is an enlarged detail section of one of the wire-feeding devices. Fig. 15 is a face view of the feeding device shown in Fig. 14. Fig. 16 is an enlarged plan view of the ratchet-and-eccentric mechanism for operating the stapling mechanism and causing the same to revolve around the mold. Fig. 17 is a view similar to Fig. 16, but showing the parts in a different position—that is to say, showing the stapling mechanism moved one-quarter of its circular path of travel around the basket. Fig. 18 is a detail view illustrating the hoop-guides and showing a hoop being applied.

One feature of my invention consists of the upright body A, having a base portion adapted to occupy but a small amount of floor-space and having other portions adapted to support the vertically-arranged forming members and revolving stapling mechanism, together with the various shafts and gearing, in suitably-elevated positions. Still another feature of my invention and one which I find exceedingly efficient and satisfactory both from the manufacturer's and user's view-points consists of the lower forming member or form B, mounted for vertical reciprocation on the vertically-disposed spindle *b*, and the upper concave forming member or mold C, the latter secured firmly and non-rotatably to the top of the body through the medium of the set-screw $c$ or any other suitable device adapted to engage the sleeve-like extension $c'$, projecting upwardly from the top of the mold and into a socket formed in the body. The said form is adapted to be reciprocated vertically through the medium of the rotary shaft $b'$, the crank-arm $b^2$ on said shaft, and the pitman $b^3$, which latter connects the crank-arm with the interior of the hollow form. With this arrangement the web, which, it will be understood, is formed by securing together a number of splints in the usual and well-known manner, can be laid on the top of the form, and the latter in moving upwardly will then push the web upwardly and into the mold, thereby causing the web thus clamped or temporarily held between the concave and convex members to assume the shape or form desired for the basket, and this arrangement of the forming members, in connection with means adapted to revolve around the basket and drive the fastening devices, constitute an important feature of my invention; but the combination of stationary or non-rotatable forming members and revolving stapling mechanism or any revolving mechanism capable of driving fastening devices—such as nails, staples, pins, or anything else which would serve the purpose—constitutes in itself an important feature of my invention. I therefore provide the upper concave forming member or mold C with a shoulder or bearing $c^2$, and upon this shoulder or bearing is mounted a rotary head or body D. In order that the web may be given a preliminary bending before it is brought into engagement with the mold C, the said head or rotary body D is preferably provided with curved guards $d$. These semicircular guards are adapted to engage the outer portions of the web as the latter is pushed upwardly by the form B, and thereby fold the sides of the web down upon the form as it passes through and into the concave interior of the mold C.

Stapling mechanism of any suitable, known, or approved character is carried by the head or rotary body portion D and by the revolving head E, which latter, owing to its reciprocating movements toward and away from the axis about which it revolves, does not travel at a fixed distance from said axis. As previously stated, the mechanism thus caused to revolve about the basket may be of a character to drive the staples, nails, or any other suitable fastening devices; but I have elected to show and describe stapling mechanism, and such being the case it will be readily understood that it is the reciprocating movements of the head E which results in the formation and driving of the staples. The stapling mechanism thus mounted to travel around the basket can be operated in any suitable manner—as, for example, by mounting the head E on a stem $e$, which latter is adapted to reciprocate in a socket $e'$, formed in the head D, and by connecting the said head E with an eccentric cam F through the medium of a pitman $f$ and an eccentric-strap $f'$. It will be observed that the said eccentric cam is adapted to rotate upon the tubular extension $c'$ with which the mold is provided and is secured to the bevel-gear $f^2$, which latter engages another bevel-gear $f^3$ on the horizontally-disposed shaft $f^4$. Thus it is obvious that a rotation of the shaft $f^4$ results in a reciprocation of the head E toward and away from the axis about which the stapling mechanism revolves. The reciprocation of the head E, and the consequent formation and driving of the staples, is the primary effect of rotating the said eccentric cam. There is, however, a secondary or incidental effect, which consists of an intermittent or step-by-step movement of the stapling mechanism around the basket held between the two forming members. This intermittent or step-by-step movement of the stapling mechanism around the basket is obtained by securing a ratchet-wheel G to the mold and by then providing the connecting-pin $g$, to which the pitman $f$ is connected, with a couple of oppositely-acting pawls $g'$ and $g^2$, it being observed that the pawl $g'$ engages the teeth on the ratchet-wheel and causes the stapling mechanism to revolve one step when the head is reciprocated toward the basket and that the pawl $g^2$ engages the teeth in the ratchet-wheel and produces a similar movement on the part of the stapling mechanism when the head E moves away from the basket. In other words, the ratchet-wheel is non-rotatable, and for this reason the pawl $g'$ first pushes the stapling mechanism one step forward around the basket, and the pawl $g^2$ then pulls the mechanism around another step when the head moves away from the basket. A spring $g^3$ connects the two pawls, and with this peculiar and simple ratchet mechanism the stapling mechanism is moved two steps in its course of travel each time a pair of staples are driven and the stapling mechanism restored to its normal condition. In other words, the stapling mechanism moves one half the required distance when the staples are formed and driven and then moves the balance of such distance when the head E moves away from the basket; or, perhaps, more properly speaking, the staples are driven, the stapling mechanism then caused to revolve one half of the distance toward the points where the next pair of staples are to be driven, and the other half of such distance is then covered by the stapling mechanism when the head E again moves toward the basket.

It will be observed that the top of the form is preferably more or less concave, so as to receive the combined thickness of the splints where they cross at the center of the web. For this reason a weighted plunger H, which is secured to the lower end of the spindle $h$, is provided at its upper end with the weight $h'$. With this provision the center of the web is pressed into the concave portion of the form during the operation of forming and stapling the basket. Also when the form is withdrawn the said plunger forces the completed basket downwardly and out of the mold and causes it to remain upon the form.

In Fig. 9 a basket is shown in the process of formation. From this view it will be seen that the head D is provided with a couple of hoop-guides I, into which the hoops can be inserted, and thus accurately applied to the basket, the hoops after being once secured to the basket at their ends then drawing through the guides as the stapling mechanism revolves around the basket. When the form B descends, the completed basket is then removed in any suitable manner. For example, the body can be provided with a stripper J, adapted to enter one side of the form, so as to engage the lower edge of the completed basket, and thereby force the basket upward slightly at one side or loosen it sufficiently to permit it to be readily removed.

The driving mechanism for operating the different instrumentalities thus provided for forming and stapling the basket comprises a bevel-gear K, secured to the end of the horizontally-disposed lower shaft $b'$, a similar bevel L, engaging the bevel K and secured to the lower end of the vertically-disposed shaft M, another bevel-gear N, mounted on the top of said shaft M and adapted to engage another bevel O, loosely mounted on the shaft $f^4$, together with friction clutch members P and Q, secured, respectively, to the said shaft $f^4$ and the bevel O, and an intermediate or loosely-driven clutch member R. Any suitable arrangement—as, for example, a hand-lever S, connected as shown—can be employed for shifting the driven clutch member R into engagement with either of the clutch members P and Q. With this arrangement, it will be seen that the power can be first applied through the shaft M, so as to cause the form to rise and clamp the web between its upper surface and the inner concave surface of the mold. Then the power-transmitting connection thus established can be opened by shifting the clutch, and the power then communicated through the shaft $f^4$ to the stapling mechanism. In this way the gearing can be controlled to first operate the means for forming the basket and to then operate the means for forming and driving the staples. In other words, the forming means can be first operated and then allowed to remain inert while the power is employed for operating the stapling mechanism.

As previously stated, the means for forming and driving the staples can be of any known or suitable construction. In other words, there are various known devices which are capable of feeding wire, cutting the wire up into lengths, and forming such lengths into staples, and then driving these staples into the basket or other work held by the forming members. For example, each of the two stapling devices which I have shown for simultaneously driving two staples through both hoops of the basket may be constructed as shown in Figs. 4, 5, 6, 7, and 8 and arranged on the swinging stapling-head, as shown in Figs. 1, 2, and 9. As illustrated, each stapling device comprises a box T, secured to the head D and adapted to provide a housing and guideway for the staple-former and staple-driver. The staple-former $t$ is yieldingly connected with the head E through the medium of a suitable spring $t'$ and is provided with a vertical slot $t^2$, terminating at its upper end in a round opening $t^3$. The staple-driver $t^4$ is rigidly secured at its outer end to the head E and provided at its inner portion with a driving portion $t^5$, terminating at its upper end at the round opening $t^6$. It will be observed that the driving portion $t^5$ is adapted to slide up and down in the groove or slot $t^2$, but only while the staple is being driven into the basket. While the staple is being formed the staple-driver and staple-former are locked against relative movement by the pin $t^7$, which is provided with a cylindric portion adapted at such time to project through or extend into both of the openings $t^3$ and $t^6$, but provided also with a flat portion adapted to slide in the slot $t^2$ after the operation of forming the staple has been completed. The reciprocation of this pin $t^7$, so as to alternately lock and unlock the staple-former and staple-driver, is accomplished through the provision of cam-surfaces $t^8$ and $t^9$, the former adapted to shift the pin in a direction to unlock the staple-driver from the staple-former and the latter adapted upon the return movement of the driver to lock the latter to the staple-former. While the staple-former and staple-driver are moved downward together and before the pin $t^7$ strikes the cam-surface $t^8$ the loop-bar $t^{10}$ projects into the path of the staple-former, and thus forms the means over which the lower end portions of the staple-former may bend the short length of wire into staple form, it being understood that the wire is fed through the box T and over the loop-bar through the medium of any suitable device or arrangement. For example, the wire may be fed through a tube $t^{11}$, and one side edge of the staple-former can then be sharpened to act as a knife, so that it will first cut off the projecting end portion of the wire and then bend the same into staple form over the loop-bar $t^{10}$. It will be observed that this loop-bar is carried at the lower end of the short lever $t^{12}$ and that this lever is held in the position shown in Fig. 5 by a cam-finger $t^{13}$—that is to say, while the staple is being formed; but as soon as the staple has been formed then the depression $t^{14}$ in the said cam-finger permits the lug $t^{15}$ on the lever $t^{12}$ to swing inward and the lower end of the lever to swing outward by reason of its weight. This of course carries the loop-bar out of the path of the portion $t^5$ of the staple-driver; it being understood at this juncture that this portion of the driver passes on to drive the staple, while the staple-former is remaining stationary with its bifurcated end resting on the basket. Preferably, as shown in Fig. 2, one box T is mounted on one side of the head D, while the other box is mounted on the other side of said head. Such being the case, the staple-driver and staple-former of one stapling device are mounted at one side of the head E and in position to work in one of said boxes, while the other staple-driver and staple-former are mounted at the other side of the head E, and thereby adapted to slide or work in the other box. This I find to be an efficient and satisfactory arrangement, and with the stapling devices thus disposed around the revolving heads the fingers $t^{13}$ are preferably secured to the head E and the reels U for the wire are mounted in any suitable manner upon the head D.

The means for feeding the wire from which the staples are formed may, as far as the broader purposes of my invention are concerned, be of any suitable or desired form; but as a matter of further and special improvement each feeding device is preferably of the character shown more clearly in Figs. 14 and 15. It will be seen that the larger or feed roll proper, V, is provided with a gear-wheel $v$ and also with a ratchet-wheel $v'$. The wheel thus formed is mounted in any suitable manner on the bolt or other cylindric portion $v^2$, secured to the head D. The smaller or tension roll W is adapted to engage the said larger or feed roll proper and is provided with a gear-wheel $w$. The two gear-wheels thus provided and associated with the two rolls between which the wire is fed are adapted to engage each other, as shown in Figs. 14 and 15, and to thus insure rotation of the two rolls in a satisfactory and effective manner. The roll W, with its gear-wheel $w$, is preferably mounted upon the reduced eccentric end portion of the rotary pin $w'$, mounted to turn in a bearing formed in the head D. With this arrangement a spring $w^2$, inserted in the end of said eccentric pin and adapted to engage a projection on the head D, can be employed as a means for preserving the proper pressure or tension of the smaller roll upon the larger roll, thus insuring a positive feed, and it will be observed that the gear-wheels are positioned in a plane intermediate of the feed-rolls and the ratchet-wheel. Thus constructed the feeding device is actuated by a pawl $w^3$, carried by the head E and adapted to engage the said ratchet-wheel $v'$. It will be readily understood that the stapling device at the other side of the heads is of the same construction, and for this reason the foregoing description of one device is sufficient.

Inasmuch as the shaft $b'$ and the vertically-reciprocating stem or spindle $b$ are arranged at right angles to each other, it will be seen that the shaft M is preferably tilted or inclined slightly, as shown in Fig. 3. This, it will be seen, results in a simplified yet efficient arrangement of the forming members and of the power-transmitting connections for operating such members; but it is of course only the lower of the two forming members which is positively actuated, the upper forming member or mold being absolutely stationary.

From the foregoing it will now be seen that I provide a simple and efficient machine whereby a basket of the particular form known as a "bushel basket" may be quickly and easily made without the necessity of rotating the basket during the operation of driving the fastening devices employed in making baskets or similar receptacles.

The staples may be clenched directly upon the outer surface of the form; or, if desired, the yielding clench-blocks may be mounted in the said form and arranged in two circumferential rows, as shown in the drawings. If this arrangement is employed, each clench-block can be provided with a stem $x$, having a nut $x'$, whereby the clench-block is held against displacement or removal from the form. A spring interposed between the body of the clench-block and the bottom of the seat or cavity in which it is arranged constitutes the means for yieldingly holding the clench-block in its normal position. It will be understood that the clench-blocks can all be thus constructed. In this way the staple-point may be forced through the basket and clenched upon yielding clench-blocks. With the yielding clench-blocks X, I find that a more effective action is obtained, although it is obvious, of course, that other kinds of clench-blocks can be employed in combination with traveling staplers.

Obviously, as shown in Fig. 17, the pawl $g'$ slips off from the tooth which it is engaging—that is to say, is kicked out of engagement with the ratchet-wheel by the next tooth—just before the staple-points begin to enter the work. In this way the revolving stapling mechanism moves about its axis during a part of the inward stroke of the drivers and then remains stationary, owing to the disengagement of the pawl $g'$ from the ratchet-wheel while the staples are being driven. In other words, the pawl $g'$ slides forward upon the end of the tooth which it was acting upon as soon as the staples are ready to be driven, thus leaving the stapling mechanism stationary during the actual driving of the staples. Each time the staples are being driven the staplers or staple forming and driving machines are held against movement by the entrance of the locking-pin $z'$ into one of the sockets or openings $z$ in the form or workholder B. Obviously the work is held stationary throughout the entire operation of driving all of the fastening devices or staples necessary for holding the work together. Furthermore, it will be seen that the hoops consist of any suitable binding members or binding means—as, for example, wires, metal strips, or strips of wood—according to the character of the article manufactured. In any event, each stapler or staple forming and driving machine is adapted to coöperate with its alloted guide in securing a binding member to the work. Also it will be seen that the arrangement is preferably such that a plurality of staple-driving mechanisms or machines are arranged in line and moved in a direction to drive a plurality of parallel rows of staples or other fastening devices. It is evident, of course, that many of the combinations and features of my improved machine may be employed in any machine of the class described or specified or of the character set forth, according to the character of the product desired and without departing from the spirit of my invention. Obviously many advantages result from the novel construction comprising the combination of a stationary work-holding means—that is to say, a work-holding means adapted to remain stationary during the entire process of fastening together the parts of the basket—and a stapling mechanism or other equivalent arrangement adapted to travel along the surface of the work, so as to drive the staples or other fastening devices at the desired points in the work and without the necessity of moving the work at all after it is once in position to receive the fastening devices and not until the basket is ready to be thrown out or discharged from the machine. Also many advantages result from the upright position of the parts. For example, with the upright position the web as taken from a pile will naturally lie in a horizontal position, and consequently will not require to be turned to a vertical or edgewise position when placed in the machine. Again, the complete basket is delivered without the aid of the operator, for when the form moves downwardly to the starting-point the basket is stripped therefrom and rolls out upon the floor. Furthermore, with the traveling staplers the staplers start the stapling on the side of the basket which is in full view of the operator, so that the latter can see if anything is wrong with the driving of the staples and may know if the work is being started properly. In other words, the first part of the work remains in view of the operator and does not immediately and before the operator can make sure that it is all right disappear from view, and with the upright arrangement of the parts the machine takes up considerably less floor-space, which obviously is of considerable advantage, and the parts are all comparatively more accessible with respect to inspection and adjustment. Also in the novel arrangement and mode of operation the rotating parts are not under pressure, as is the case with machines heretofore employed, and this is especially true of the basket form of my improved machine, inasmuch as the pressure of the two form members is against each other and the pressure exerted consequently entirely upon the frame of the machine, and in this way we relieve the bearings of all injurious strain. In designing power-transmission connections and novel arrangement I aim to reduce the amount of power necessary to operate the machine. In addition, only one lever is needed to operate the machine, and the operator has time, owing to the automatic character of the machine, to arrange the stock for the next basket, and this, it will be seen, keeps the machine in operation practically all of the time, thereby giving the machine an increased output. When a basket is started on my improved machine, the inner hoop is dropped over the form and is usually carried to its place by gravity. The web is then laid over the form, the two hoops inserted in the hoop-guides, and then the lever is pushed one way, causing the form to push the web into the upper hollow or concave form member, thus giving it the desired shape. The same lever is then pulled the other way, when the staplers start to make and drive the staples, and after the staplers have made one complete revolution around the form and driven, say, twenty staples into each hoop the form is unlocked and descends with the completed basket, which latter is stripped from the form and thrown out upon the floor. During the time the basket is being stapled and the time of delivery there is nothing for the operator to do but watch the machine and arrange the stock for the next basket.

So far as I am now aware I am the first to provide a power-operated and automatically-traveling staple forming and driving machine.

By the expression "adapted to hold the work stationary throughout the process of fastening its parts together" I mean that the work is stationary throughout the entire intermittent operation of driving all of the staples or other fastening devices, whereby the work does not have any movement whatever from the time the first staple or other fastening device is driven until after the last staple or fastening device is driven.

What I claim as my invention is—

1. A machine for making baskets, comprising a non-rotary form and mold, mechanism for driving fastening devices, and means for causing said mechanism to travel around said mold.

2. A machine for making baskets, comprising means for forming the basket, and stapling mechanism mounted to revolve around said basket-forming means.

3. A machine for making baskets, comprising means for forming the basket, mechanism for driving fastening devices, and means for causing said mechanism to revolve around the basket.

4. A machine for making baskets, comprising upright non-rotary basket-forming means, means for driving fastening devices, and a power-operated ratchet device connected and arranged for causing said mechanism to have a step-by-step movement around said basket.

5. A machine for making baskets, comprising an upper concave non-rotary forming member, a lower convex non-rotary and vertically-reciprocating forming member, stapling mechanism mounted to revolve around the said upper member, and power-operated means for causing said stapling mechanism to have a step-by-step movement around the basket.

6. A machine for making baskets, comprising vertically-disposed forming means comprising a convex member and a concave member adapted to be alternately separated and brought together, stapling mechanism mounted to revolve about one of said members, and means including a ratchet device for causing said mechanism to have a step-by-step movement around the basket.

7. A machine for making baskets, comprising non-rotary basket-forming means, revolving mechanism for driving fastening devices, and means including a stationary ratchet-wheel, and devices engaging said ratchet and revolving with the fastener-driving mechanisms, for causing said mechanism to have a step-by-step movement around the basket, the said machine being adapted to hold the work stationary throughout the process of fastening its parts together.

8. A machine for making baskets, comprising non-rotary basket-forming means, stapling mechanism mounted to revolve around the basket-forming means, and means including a stationary ratchet-wheel, an eccentric cam device, and a pair of pawls adapted to engage said ratchet-wheel, and revolving with the stapler mechanism, for causing said mechanism to have a step-by-step movement around the basket, the said machine being adapted to hold the work stationary throughout the process of fastening its parts together.

9. A machine for making baskets, comprising an upright frame, a lower non-rotary forming member mounted for vertical reciprocation, an upper non-rotary convex stationary forming member, and a horizontally-disposed shaft mounted beneath said lower forming member, an arm on said shaft, a pitman connecting said arm with said lower forming member, means for rotating said shaft for the purpose of alternately separating said forming members and bringing them together, and revolving mechanism for driving fastening devices.

10. A machine for making baskets, comprising a non-rotary mold, a non-rotary form, means for bringing the mold and form together, and a guard intermediate of the said mold and form, said guard being mounted to rotate while the basket remains stationary, together with stapling mechanism mounted to revolve with the said guard.

11. A machine for making baskets, comprising suitable basket-forming means, suitable means for driving fastening devices, power-transmitting connections, and a clutch whereby the basket-forming means may be operated and then allowed to remain inert while the power is being communicated through the same clutch to the mechanism for driving the fastening devices, and until the basket is completed, the fastener-driving devices revolving around the work, the said machine being adapted to hold the work stationary throughout the process of fastening its parts together.

12. A machine for making baskets, comprising a basket-forming means, stapling mechanism mounted to revolve around the basket, and means for causing the said mechanism to have an intermittent movement around the basket, said stapling mechanism comprising devices for simultaneously forming and driving two staples at a time.

13. A machine for making baskets, comprising non-rotary basket-forming means, a support adapted to revolve around the basket, stapling devices mounted at opposite sides of said support, and means for giving said support a step-by-step movement around the basket.

14. A machine for making baskets, comprising basket-forming means, mechanism for driving fastening devices, and means for causing said mechanism to travel along and drive the fastening devices at different points in the basket, the fastener-driving mechanism having an endless path of travel about the work, the said machine being adapted to hold the work stationary throughout the process of fastening its parts together.

15. A machine for making baskets, comprising basket-forming means provided with yielding clench-blocks, revolving stapling mechanism, and means for causing such stapling mechanism to have a step-by-step movement around the basket, the said machine being adapted to hold the work stationary throughout the process of fastening its parts together.

16. A machine for use in making receptacles, comprising means for holding the work, a stapler mounted to travel along and drive staples at different points in the work, while the latter remains stationary, and means for operating said stapler, and for causing the same to have a step-by-step movement along the surface of the work, the staple-driving mechanism having an endless path of travel about the work, the said machine being adapted to hold the work stationary throughout the process of fastening its parts together.

17. A machine for use in making receptacles, comprising means for holding the work, traveling mechanism for driving fastening devices at different points in the work while the latter remains stationary, and means for operating said mechanism, and for causing the same to have a step-by-step movement along the surface of the work, the fastener-driving mechanism having an endless path of travel about the work, the said machine being adapted to hold the work stationary throughout the process of fastening its parts together.

18. A machine for use in making articles, comprising means for holding the work stationary, traveling mechanism for driving fastening devices, and means for operating said mechanism, and for causing the same to have a step-by-step movement along the surface of the work, the fastener-driving mechanism having an endless path of travel about the work, the said machine being adapted to hold the work stationary throughout the process of fastening its parts together.

19. A machine for operating on materials, comprising means for holding the work, traveling mechanism for driving fastening devices, and means for operating said mechanism, and for causing the same to move along the surface of the work, the fastener-driving mechanism having an endless path of travel about the work, the said machine being adapted to hold the work stationary throughout the process of fastening its parts together.

20. In a machine of the character described, means for holding the work stationary, a plurality of staplers mounted in a row and supported for movement in a direction to drive a corresponding number of parallel rows of staples in the stationary work, and means for thus advancing the staplers in a step-by-step manner.

21. In a machine of the character described, means for holding the work stationary, a plurality of staplers mounted in a row and supported for movement in a direction to drive a corresponding number of parallel rows of staples in the stationary work, and means for thus advancing the staplers in a step-by-step manner, together with wire-reels mounted on the traveling staplers, and feed devices also carried by the staplers and adapted to feed the wires thereto for conversion into staples.

22. In a machine of the character described, means for holding the work stationary, a plurality of staplers mounted in a row and supported for movement in a direction to drive a corresponding number of parallel rows of staples in the stationary work, and means for thus advancing the staplers in a step-by-step manner, together with guiding devices carried by the traveling staplers and adapted for guiding parallel binding members onto the work at points in line with the insertion of the staples, each traveling stapler and its allotted traveling guide being adapted to coöperate in securing one of the binding members to the outer surface of the work.

23. In a machine of the character described, means for holding the work stationary, a plurality of staplers mounted in a row and supported for movement in a direction to drive a corresponding number of parallel rows of staples in the stationary work, and means for thus advancing the staplers in a step-by-step manner, together with traveling devices for guiding binding means onto the work, and overlying means for holding the work down in place while the staplers are securing the binding thereto.

24. In a machine of the character described, means for holding the work stationary, a plurality of staplers mounted in a row and supported for movement in a direction to drive a corresponding number of parallel rows of staples in the stationary work, and means for thus advancing the staplers in a step-by-step manner, together with a locking means for holding the staplers stationary each time the staples are being inserted.

25. In a machine of the class described, suitable means for holding the work, a traveling stapler, a guiding device movable with the stapler and adapted to guide a binding member onto the work, means for operating the stapler, and means for advancing the stapler and its guide, the stapler and guide being adapted to coöperate in securing the binding to the work.

26. In a machine of the class described, an automatically-traveling stapler, and a guide for directing a binding onto the work ahead of and along a line coincident with the insertion of the staples.

27. In a machine of the class specified, power-operated automatically-traveling staple forming and driving machines mounted for simultaneous movement in a direction to drive a plurality of parallel rows of staples.

28. In a machine of the character described, a plurality of traveling guides for directing binding means onto the work, and traveling staple forming and driving machines adapted to coöperate with said traveling guides in securing the binding to the work along parallel lines of attachment.

29. In a machine of the class specified, a power-operated and automatically-traveling staple forming and driving machine.

30. In a machine of the class described, the combination of a work-holder mounted only for bodily movement in a straight line, a stationary bed or support on which the work-holder is supported for sliding movement, a plurality of staple forming and driving machines adapted to insert the staples in a direction at right angles to the movement of the work-holder, guiding devices associated with said machines, power connections for operating said machines, means for causing a bodily step-by-step relative traveling movement between said work-holder and the said stapling-machines, said bodily relative movement being in a direction to drive the staples in a plurality of parallel rows, said guiding devices being adapted and arranged for guiding suitable parallel flexible binding members onto the outer surface of the work, said work-holder being adapted to receive blank material comprising sheets or strips, the said work-holder being provided with means for holding the work against displacement thereon, and said stapling-machines and guiding devices being adapted to coöperate in securing the said binding to the said sheets or strips.

Signed by me at St. Joseph, Berrien county, Michigan, this 1st day of June, 1904.

EDWARD CRAIG.

Witnesses:
 H. C. KILGOUR,
 W. H. RAY.